United States Patent [19]

Yamagata

[11] Patent Number: 4,502,835

[45] Date of Patent: Mar. 5, 1985

[54] MULTISTAGE HYDRAULIC MACHINE

[75] Inventor: Ichiro Yamagata, Yokohama, Japan

[73] Assignee: Tokyo Shibaura Denki Kabushiki Kaisha, Kawasaki, Japan

[21] Appl. No.: 416,630

[22] Filed: Sep. 10, 1982

[30] Foreign Application Priority Data

Sep. 14, 1981 [JP] Japan .................................. 56-143778

[51] Int. Cl.³ ............................................... F03B 3/10
[52] U.S. Cl. .................................... 415/104; 415/113; 415/500; 415/1; 415/112
[58] Field of Search .................... 415/104, 1, 500, 110, 415/112, 113

[56] References Cited

U.S. PATENT DOCUMENTS

| 1,499,056 | 6/1924 | Hollander | 415/104 |
| 3,370,828 | 2/1968 | Willi | 415/104 |
| 3,746,461 | 7/1973 | Yokata et al. | 415/104 |
| 3,895,689 | 7/1975 | Swearingen | 415/104 |
| 3,985,464 | 10/1976 | Hachiya et al. | 415/1 |
| 4,158,525 | 6/1979 | Kawase et al. | 415/1 |
| 4,170,435 | 10/1979 | Swearingen | 415/104 |
| 4,207,023 | 6/1980 | Tsunoda . | |
| 4,295,781 | 10/1981 | Ogiwara et al. | 415/110 |

FOREIGN PATENT DOCUMENTS

| 2826587 | 12/1978 | Fed. Rep. of Germany | 415/104 |
| 113738 | 9/1979 | Japan | 415/1 |
| 52574 | 5/1981 | Japan | 415/1 |

Primary Examiner—Samuel Scott
Assistant Examiner—Brian J. Bowman
Attorney, Agent, or Firm—Oblon, Fisher, Spivak, McClelland & Maier

[57] ABSTRACT

A multistage hydraulic machine which includes a housing, a main shaft mounted in the housing, a high-pressure stage and low-pressure stage runner firmly secured to the main shaft wherein the housing has formed therein a plurality of runner chambers enclosing each of the runners, respectively, of the high-pressure and the low-pressure stage, a return passage communicating with the runner chambers of the high-pressure and low-pressure stages, a high-pressure stage, outer back chamber, a high-pressure stage, inner back chamber and a high-pressure stage, side chamber all of which are located within the runner chamber enclosing the high-pressure stage runner, a low-pressure stage, side pressure chamber located within the runner chamber enclosing the low-pressure stage runner, a mechanism for communicating the high-pressure stage, inner back chamber with the return passage, and a mechanism for respectively communicating the low-pressure stage, side pressure chamber with the return passage.

2 Claims, 2 Drawing Figures

MULTISTAGE HYDRAULIC MACHINE

BACKGROUND OF THE INVENTION

1. Field of the Invention

This invention relates generally to multistage hydraulic machines provided with a plurality of runners, such as multistage pumps, multistage turbines and multistage pump-turbines, and more particularly, to a multistage hydraulic machine capable of performing a safety operation by virtue of respectively restraining water thrusts developed in respective stages.

2. Description of the Prior Art

In a Francis-type hydraulic machine, axial water thrusts acting on runners thereof are generally developed by an axial imbalance of water pressures acting on respective water-contact surfaces of the runners. However, most of the axial water thrust is developed not by water pressure acting on the surfaces of runner passages surrounded by runner vanes, runner crowns and runner bands, but rather by an axial imbalance of water pressure acting on respective water-contact surfaces of the back portions of the runner crowns and bands which are rearward with respect to the runner passage surface. The pressure effected area of the runner crown backside is greater than the pressure-effected area of the runner band backside by an area which is nearly equal to the area of the runner outlet portion so that downwardly directed water pressure acting on the runner crown backside becomes greater than upwardly directed water pressure acting on the runner band backside. It is, therefore, commonly experienced that with respect to the whole runner, a downward-axial thrust heading from the crown side to the band side is developed.

In smaller capacity, smaller sized hydraulic machines, such axial water thrust can be supported by the externally disposed thrust bearing. However, in medium or larger-capacity hydraulic machines, such water thrust becomes so much greater that a thrust bearing to support such axial water thrusts is impossible to manufacture and thus it becomes necessary to alleviate such axial water thrusts in an appropriate manner.

Therefore, hitherto in a single-stage hydraulic machine it has been common practice to dispose an intermediate seal on the runner crown backside so that a runner back chamber which is positioned between the runner crown and the head cover can be partitioned to from an inner and outer back chamber, and further to utilize an inner equalizing pipe or a balancing hole which communicates with a runner outlet portion or a draft tube portion, respectively, at the inner back chamber. This construction permits lowering of the water pressure of the inner back chamber with respect to the water pressure level at the runner outlet.

As the water pressure of the inner back chamber is acting on the runner crown backside, the water thrust caused by the water pressure of the inner back chamber, which is acting downwardly on the runner, is reduced by the above-mentioned construction. Therefore, the water thrust acting on the whole runner is also reduced by the above-mentioned construction.

Also in the case of a multistage hydraulic machine, in terms of the runner of the highest-pressure stage thereof being the same as in the above-described singlestage hydraulic machine, it is possible to dispose an intermediate seal on the runner backside portion, and further to dispose an inner equalizing pipe which communicates with lower-pressure flow passage at the inner back chamber so that the hydraulic pressure therein is lowered. However, in terms of the runners of lower-pressure stages except the highest-pressure stage, the runner backside portions are situated in the center portion of hydraulic machine, which is extremely complicated in construction, so that there are encountered many difficulties such that an inner equalizing pipe can hardly be utilized, and even if an intermediate seal could be disposed on the runner crown backside, an appropriate seal clearance thereof can scarcely be established and maintained. Thus, it is almost impossible to carry out sufficient maintenance and inspections without dismantlement of the entire machine such that there are many impractical aspects in the device described above. Accordingly, it has been a common practice not to dispose an intermediate seal on the runner crown backside but instead to inevitably support the developed water thrust by means of an externally disposed thrust bearing.

Therefore, multistage hydraulic machines have inevitably had to utilize larger capacity thrust bearings, and this has been a great obstacle to development of larger capacity multistage hydraulic machines which produce excessively larger capacity hydraulic thrusts.

SUMMARY OF THE INVENTION

Accordingly, one object of this invention is to provide a new and improved multistage hydraulic machine constructed to reduce axial water thrust acting on respective stages, thereby alleviating the overall water thrust.

Briefly, in accordance with one aspect of this invention, there is provided a multistage hydraulic machine which includes a main shaft, a plurality of runners firmly secured to the main shaft, runner chambers enclosing runners of respective stages, return passages communicating the runner chambers of the respective stages, a high-pressure stage runner chamber provided with a high-pressure stage outer back chamber, a high-pressure stage inner back chamber and a high-pressure stage side chamber, and low-pressure stage side chamber constituted within runner chambers of respective low-pressure stages excluding the high-pressure stage; and is characterized in that there are provided first means for communicating the high-pressure stage inner back chamber with the vicinity of the high-pressure stage runner at the return passage, and second means for respectively communicating the low-pressure stage side chamber of respective stages with the vicinity of the side chambers at the return passages of adjacent high-pressure sides.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
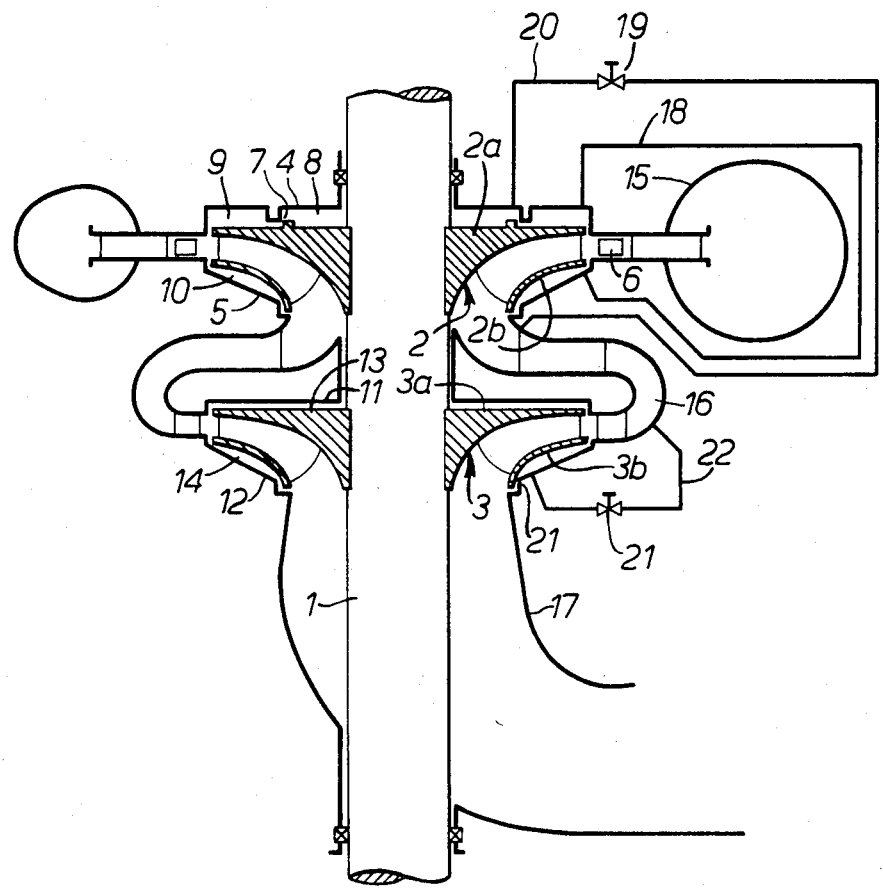
FIG. 1 shows a sectional view of the entire construction of a multistage hydraulic machine illustrating one embodiment according to the present invention.

Referring now to the drawings, wherein like reference numerals designate identical or corresponding parts throughout the several views, and more particularly to FIG. 1 thereof, the construction of Francis-type, two-stage hydraulic machine is illustrated, for ease of appreciation, as an example of multistage hydraulic machines. Reference numeral 1 designates a main shaft of the two-stage hydraulic machine mounted in a housing, and main shaft 1 is provided with a high-pressure stage runner 2 and low-pressure stage runner 3 which are firmly secured thereto in axially spaced position. A high-pressure stage head cover 4 is disposed above high-pressure stage runner 2, and below, a high-pressure stage bottom ring 5 is disposed, respectively. Movable guide vanes 6 which adjust openings of water inlets are attached radially outwardly of high-pressure stage runner 2. Further, an intermediate seal 7 of high-pressure stage runner 2 is disposed between a runner crown 2a of high-pressure stage runner 2 and head cover 4, and intermediate seal 7 partitions the space surrounded by runner crown 2a and head cover 4 into an inner back chamber 8 of the high-pressure stage and outer back chamber 9 thereof. A side chamber 10 of the high-presure stage is formed between a runner band 2b of the high-pressure stage runner 2 and the bottom ring 5 thereof.

On the other hand, a head cover 11 of the low pressure stage is disposed above low pressure stage runner 3, and below, a bottom ring 12 of the low pressure stage is disposed, respectively. A back chamber 13 of the low-pressure stage and a side chamber 14 thereof are provided in association with a runner crown 3a of low-pressure stage runner 3 and a runner band 3b thereof.

A casing 15 is disposed radially outwardly of the movable guide vanes 6, and casing 15 is connected to a penstock (not shown). Flow passages of high-pressure stage runner 2 and low-pressure stage runner 3 are connected in series through a return passage 16, and a draft tube 17 is disposed below low-pressure stage runner 3.

On the other hand, the outer circumference of the outer back chamber 9 of the high-pressure stage and the outer circumference of the side chamber 10 of the high-pressure stage communicate with each other by means of an outer equalizing pipe 18. The outer circumference of inner back chamber 8 of the high-pressure stage and return passage 16 in the vicinity of the outlet of high-pressure stage runner 2 communicate with each other by means of an inner equalizing pipe 20 of the high-pressure stage provided with a balancing valve 19 of the high-pressure stage. The return passage 16 and the inner circumference of side chamber 14 of the low-pressure stage communicate with each other by means of a communicating pipe 22 which has a pressure regulating valve 21.

Figure 2:
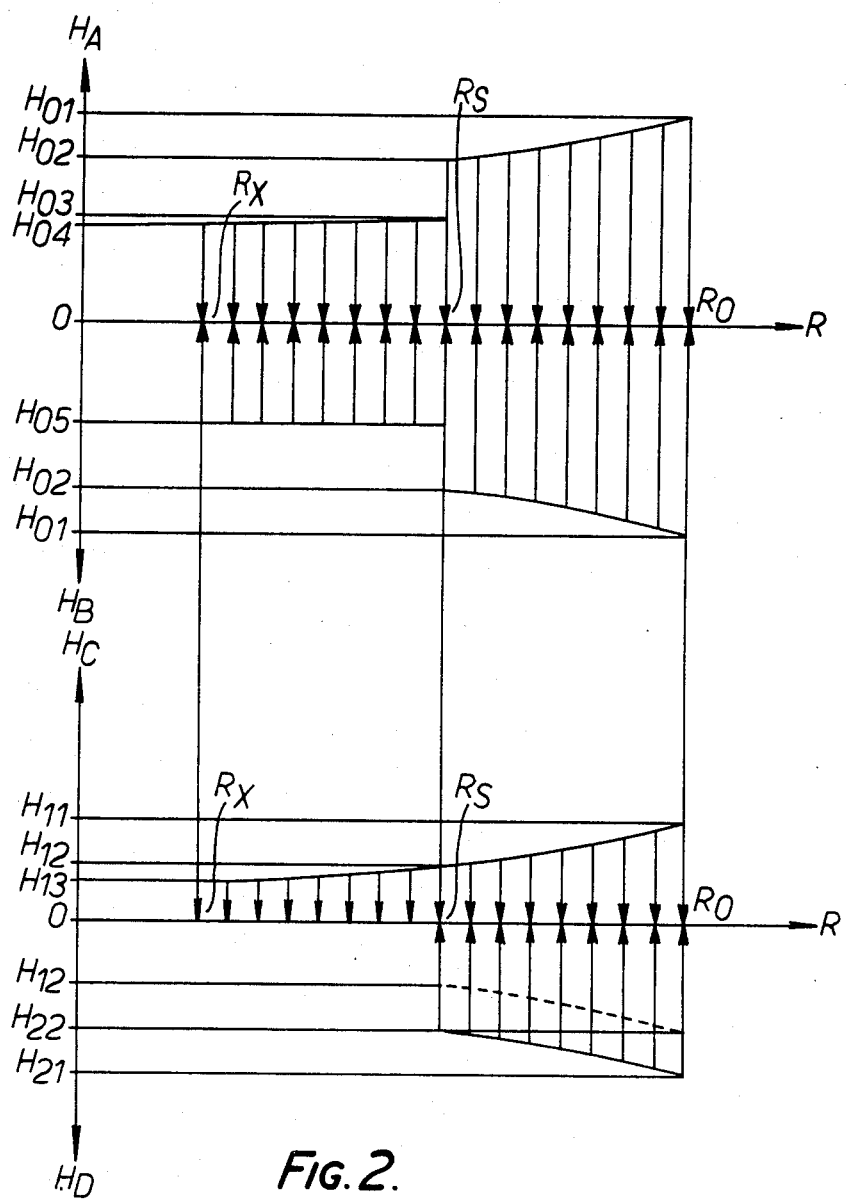
FIG. 2 shows a graph illustrating the water pressure distribution in the multistage hydraulic machine shown in FIG. 1.

The operation of the above-described embodiment will be described hereinafter. FIG. 2 shows a graph illustrating water pressure distributions of the back pressure chamber and the side pressure chamber at respective stages in the steady-state operation of the two-stage hydraulic machine shown in FIG. 1.

In FIG. 2, the abscissa designates radial distance from the shaft center while the ordinate designates, on the basis of water pressure of draft tube 7, water pressure $H_A$ of inner back chamber 8 and outer back chamber 9 of the high-pressure stage, water pressure $H_B$ of side chamber 10 of the high-pressure stage, water pressure $H_C$ of the back chamber 13 of the low-pressure stage, and water pressure $H_D$ of side chamber 14 of the low pressure stage, respectively. The arrow marks in the graph indicate the directions onto which the respective water pressures act. The back chamber water pressure $H_A$ of the high-pressure stage shows at the outermost circumference $R_O$ of outer back chamber 9 a pressure $H_{O1}$ which is slightly lower than outer circumference pressure of high-pressure stage runner 2. The water within outer back chamber 9 undergoes enforced vortex movement caused by the runner rotating so that the water pressure gradually becomes lower towards the inner circumference. Thus, at the innermost circumference of outer back chamber 9, that is, at the radial position $R_S$ of intermediate seal 7, the pressure drops to a pressure of $H_{O2}$. At inner back chamber 8, which is further within the radial position $R_S$ of intermediate seal 7, an inner equalizing pipe 20 utilizing balancing means 19 is connected to the outer circumference of inner back chamber 8 so as to communicate with return passage 16 in the vicinity of the outlet of high-pressure stage runner 3, so that water pressure at the outermost circumference position $R_S$ of inner back chamber 8 is lowered to the pressure $H_3$ which is equivalent to or slightly higher than the runner outlet water pressure $H_{O5}$ of the high-pressure stage. At radial position $R_X$ which is the innermost circumference of the inner back pressure chamber, the water pressure becomes slightly lower than the water pressure $H_{O3}$ due to the effect of the enforced vortex movement within inner back chamber 8. On the other hand, in terms of the water pressure $H_B$ of side chamber 10 of the high-pressure stage, since the outer circumference of side-pressure chamber 10 is communicated, by connection of outer equalizing pipe 18 of the high-pressure stage, with the outer circumference of outer back chamber 9 of the high-pressure stage, the water pressure at the radial position $R_O$ which is the outermost circumference of side chamber 10 of the high-pressure stage becomes $H_{O1}$ which is equal to the water pressure of the outermost circumference of outer back chamber 9 of the high-pressure stage. The water pressure within side chamber 10 of the higher-pressure stage also undergoes enforced vortex movement at an angular velocity nearly equal to that of the water flow within outer back chamber 9 of the high-pressure stage, so that the water pressure at the radial position $R_S$ which is the innermost circumference of side chamber 10 of the high-pressure stage also becomes $H_{O2}$ nearly equal to the water pressure of the innermost circumference of outer back chamber 9. Therefore, water pressure distributions within outer back chamber 9 of the high-pressure stage runner and side chamber 10 are equal to each other, and water pressure within inner back chamber 8 is also nearly equal to the water pressure at the outlet portion of high-pressure stage runner 2, so that the respective water pressures are cancelled with each other and thus high-pressure stage runner 2 produces no imbalanced water thrust.

Next, the water pressure $H_C$ of back chamber 13 of low-pressure stage runner 3 is, at the radial position $R_O$ of outer circumference of the low-pressure stage, nearly equal to the water pressure $H_{11}$ of the outer circumference of the low-pressure stage runner 3. However, the water pressure gradually becomes lower towards the inner circumference due to an enforced vortex movement, being the same as that of the water flow within the back chamber 9 of the high pressure stage. Thus, the water pressure at the radius $R_S$ is lowered to $H_{12}$, and at the innermost circumference which is the radius $R_X$, the water pressure is further lowered to $H_{13}$. On the other hand, in terms of the water pressure $H_D$ within side chamber 14, the inner circumference of side chamber 14 is communicated, by connection of communicating tube 22, with return passage 16 so that the water pressure at the radial position $R_S$ of the innermost circumference of side chamber 14 of the low-pressure stage becomes $H_{22}$ which is nearly equal to the water pressure of return passage 16. Since the water pressure of return passage 16 is nearly equal also to the water pressure of the outer circumference of lower pressure stage runner 3, the water pressure $H_{22}$ is nearly equal also to the water pressure $H_{11}$ of the outermost circumference of low-pressure stage back chamber 13. The water flow within side chamber 14 undergoes an enforced vortex movement, the same as that of back pressure chamber 13, so that the water pressure gradually becomes higher towards the outer circumference. Thus at the outermost circumference $R_O$, the water pressure becomes $H_{21}$ which is higher than the water pressure $H_{22}$.

When considering the water pressure distribution of the side pressure chamber of the low-pressure stage in the case of the conventional two-stage hydraulic machine without the above-described communicating tube 22, the water pressure of the outermost circumference of side chamber 14 becomes $H_{11}$ which is equal to the water pressure of the outermost circumference of back chamber 13, and becomes $H_{12}$ at the innermost circumference. This is illustrated in FIG. 2 as a water presure distribution represented by dotted lines. In this case, it can be understood that in the outer circumference of the radial position $R_S$, the back chamber 13 and side chamber 14 have equal water pressure distributions so that the water pressures within respective chambers situated outside the radial position $R_S$ cancel each other, and a downward thrust is developed due to the effect of the water pressure of the back pressure chamber situated within the radial position $R_S$. However, according to the present invention, in the outer circumference of the radial position $R_S$, the water pressure of the side chamber becomes higher. Thus, it becomes possible to produce a water pressure force at side chamber 14 in such a direction as to cancel the downward water pressure force developed within back chamber 13 which is situated in the inner circumference of the radial position $R_S$. Therefore, according to the present invention, it will be possible to suppress water thrusts operating on the lower-pressure stage runner, and also to minimize water thrusts per se of hydraulic machines which may be obtained as the sum of respective water thrusts operating on the respective stage runners. It is also to be understood that the present invention may be practiced in a multistage hydraulic machine which does not include movable guide vanes located radially outside of the higher-pressure stage runner 2.

As described above, according to the present invention, water thrusts to be developed at respective stage runners of multistage hydraulic machines can respectively be suppressed to minimal values, so that large axial thrusts are not imparted by the respective stage runners and connecting portions of the main shaft. Thus, construction of rotational portions can be realized, while at the same time the axial thrust per se of multistage hydraulic machine which is represented as the sum of hydraulic thrusts operating on respective stage runners can also be minimized so that uneconomial larger capacity thrust bearings will no logner be required. Consequently it will be possible to manufacture, in an extremely desirable manner, multistage hydraulic machines larger in size and capacity.

Obviously, numerous additional modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the Unites States is:

1. A multistage hydraulic machine comprising:
    a housing;
    a main shaft mounted in said housing;
    a high-pressure stage runner and low-pressure stage runner firmly secured to said main shaft, wherein said housing has formed therein:
    a plurality of runner chambers enclosing each of said runners, respectively, of said high-pressure stage and said low-pressure stage,
    return passage means communicating with said runner chambers of said high-pressure stage and low-pressure stage,
    a high-pressure stage, outer back chamber, a high-pressure stage, inner back chamber and a high-pressure stage, side chamber all of which are located within said runner chamber enclosing said high-pressure stage runner,
    a low-pressure stage, side pressure chamber located within said runner chamber enclosing said low-pressure stage runner;
    means for communicating said high-pressure stage inner back chamber with said return passage means; and
    means for respectively communicating said low-pressure stage side pressure chamber with said return passage means;
    wherein said means for communicating said high-pressure stage inner back chamber with said return passage means further comprises balancing valve means.

2. A multistage hydraulic machine as set forth in claim 1, wherein said means for respectively communicating said low-pressure stage, side pressure chamber with said return passage means further comprises pressure regulating valve means.

* * * * *